United States Patent Office 2,790,839
Patented Apr. 30, 1957

2,790,839

LOW HYSTERESIS RUBBER TREATMENT

Kenneth W. Doak, Bloomfield, N. J., assignor to United States Rubber Company, New York, N. Y., a corporation of New Jersey No Drawing. Application November 16, 1953, Serial No. 392,483

3 Claims. (Cl. 260—763)

This invention relates to improvements in the technique of processing mixtures of carbon black and high-unsaturation rubbers prior to vulcanization thereof.

The technique of processing rubber mixes loaded with carbon black, prior to vulcanization thereof, whereby to obtain vulcanizates with improvements in physical and chemical properties, is described in Gerke et al. U. S. P. 2,118,601. The improved vulcanizates prepared by the technique of Gerke et al. differ from the usual vulcanizates produced by older techniques in that they have relatively (1) lower modulus at low elongation, (2) higher modulus above 300% elongation, (3) higher resistance to abrasion, (4) lower torsional hysteresis, and (5) higher electrical resistivity, and are (6) relatively softer.

The improved vulcanizates of Gerke et al. are obtained by incorporating uniformly in the rubber a relatively large amount of carbon black, for example, at least 25 parts, and preferably in the case of tire treads at least 40 parts, by weight of carbon black per 100 parts by weight of rubber, and then subjecting the mixture to a heat treatment at a temperature substantially above 250° F., the preferred temperature being in the range from about 300° F. to 370° F., and masticating the mix during and/or after such heat treatment, or alternately therewith. The duration of the special heat treatment is varied with the temperature employed, the higher the temperature the shorter the time, and is governed also by the degree of change desired in the properties of the ultimate vulcanized product which properties are gauged to be compatible with its final use. In general, heat treatments of from 10 to 60 minutes duration are said to be suitable for most purposes, particularly within the preferred temperature range.

The principal object of the present invention is to provide new chemical promoters for the processing of rubber and carbon black mixtures at relatively high temperatures as in processes of the general type disclosed in the above-mentioned Gerke patent. Such processing is often referred to as low-hysteresis processing and is usually designed to produce high electrical resistance and low torsional hysteresis, particularly in rubber stocks used for the manufacture of pneumatic tires and more particularly tread stock. A further object is to bring about a substantial reduction in the time of such processing by the use of the herein disclosed chemicals whereby an important increase in the capacity and output of the equipment is obtained with the result that such processing is rendered more commercially feasible. Other objects and advantages of my invention will more fully hereinafter appear.

The present invention is based upon my discovery that piperidinium pentamethylene dithiocarbamate is an effective promoter of "low-hysteresis processing" of mixtures of carbon black and high-unsaturation rubber.

Piperidinium pentamethylene dithiocarbamate substantially decreases the time and/or lowers the temperature necessary for such low-hysteresis processing, that is the rate of the low-hysteresis processing reaction at a given temperature is materially increased.

The process of my invention comprises mixing natural rubber or a synthetic rubbery polymer of an aliphatic conjugated diolefin, i. e., a homopolymer of an aliphatic conjugated diolefin or a copolymer of such a diolefin with a copolymerizable monoolefinic compound, which copolymer contains at least 50% of combined diolefin, with a relatively large amount of a rubber-reinforcing carbon black and a relatively small but effective amount, e. g., from one to three parts per 100 parts of rubber, of piperidinium pentamethylene dithiocarbamate, and heating this mixture at a temperature of at least 275° F. but short of a temperature at which the rubber will be injured, to bring about the desired changes in the rubber and carbon black mixture. This heat treatment, carried out in the absence of sulfur and sulfur-yielding compounds, effects such a change in the properties of the mixture that when it is vulcanized it will possess a substantially reduced torsional hysteresis, a substantially increased electrical resistivity and a substantially increased abrasion- and wear-resistance. Following the heat treatment, the vulcanizing and other desired compounding ingredients including conventional accelerators and the like are intimately incorporated in the conventional manner, after which the mixture is shaped and vulcanized in the usual way.

Any carbon black which is capable of reinforcing the rubber can be used in the practice of my invention. I usually use either a furnace black or a channel black. Those skilled in the art will appreciate that the type of black is often selected with reference to the particular rubber employed. The amount of carbon black present during the heat treatment should be equal to at least 25 parts per 100 parts by weight of rubber. Preferably the amount of carbon black is equal to at least 40 parts per 100 parts of rubber, the use of such high proportions of carbon black being particularly desirable in the case of tread stocks. The amount of carbon black present during the heat treatment can be as much as 100 parts per 100 parts of rubber.

My invention is particularly applicable to mixtures of natural rubber, e. g., Hevea rubber, and carbon black. My invention is less effective with the aliphatic conjugated diolefin homopolymers and copolymers containing at least 50% of combined diolefin. Examples of high-unsaturation synthetic rubbers to which my invention can be applied although not as effectively as with natural rubber, are rubbery butadiene-styrene copolymers, e. g., ordinary GR-S, and rubbery butadiene-acrylonitrile copolymers, i. e., so-called Buna N rubber.

In the preferred practice of my invention the heat treatment of the mixture of rubber, carbon black and piperidinium pentamethylene dithiocarbamate is carried out by mastication at temperatures in the range of 275–400° F., with any suitable type of masticating equipment such as an open two-roll rubber mill or more preferably an internal rubber mixture, especially a Banbury mixer. The Banbury mixer is particularly advantageous because it exerts a severe masticatory action upon the charge and because it conserves the heat generated by the mixing action and this heat greatly aids in elevation of the stock temperature to within the desired range. Depending upon the size and operating speed of the Banbury mixer, and other factors, extraneous heat may or may not need to be applied to bring the stock temperature within the desired temperature range and to hold it there. If desired, extraneous cooling may be applied to keep the temperature from rising above the desired level.

The optimum duration of the heat treatment will vary, depending upon many factors including the temperature of heat treatment, type of mixture, amount of piperidinium pentamethylene dithiocarbamate, etc. In any event, it will be considerably shorter, at given temperature conditions, than the time required when the piperidinium pentamethylene dithiocarbamate is omitted. When using the preferred masticatory heat treatment, times of the order of 5 to 15 minutes at temperatures of from 275° to 400° F., the longer times being used with the lower temperatures in said range and vice versa, will generally be adequate for the purposes of my invention. It is well known that different rubbers vary as to the highest temperatures they can withstand without harm, and the temperature and time of treatment should of course be so limited that no injury to the rubber mixture occurs.

It is preferable to form an intimate mixture of the rubber, carbon black and piperidinium pentamethylene dithiocarbamate at a relatively low temperature, e. g., not over 250° F., in order to avoid premature reaction of the dithiocarbamate with the rubber whereby its promoting effect upon the low hysteresis processing would be seriously reduced.

The following example illustrates the preferred method of practicing my invention. All parts are by weight.

Example

A masterbatch is prepared by mixing together 100 parts of Hevea rubber, 50 parts of carbon black (a medium processing channel black commercially known as "Spheron #6") and five parts of stearic acid. This mixing operation is carried out in a conventional manner in a Banbury mixer or on a two-roll rubber mill. To 155 parts of this masterbatch is added 2.4 parts of piperidinium pentamethylene dithiocarbamate on a two-roll mill at 150–250° F. The mill temperature is then raised to 300° F., and the mixture is then masticated for 10 minutes. Thereafter, 2 parts of pine tar, 2 parts of zinc oxide, 1 part of antioxidant, 0.6 part of accelerator, and 2.6 parts of sulfur are incorporated at 150–225° F. The mixture is vulcanized 45 minutes at 287° F. As a control, an identical masterbatch is prepared and subjected to the previously described manipulative steps, except that no piperidinium pentamethylene dithiocarbamate is used. The specific electrical resistivity (expressed in ohm-centimeters) and torsional hysteresis are measured, with the following results:

|  | Log Resistivity | Torsional Hysteresis at 280° F. | ML-4 [1] at 212° F. |
| --- | --- | --- | --- |
| Without promoter | 7.8 | 0.132 | 56 |
| With promoter | 10.1 | .076 | 44 |

[1] Mooney viscosity, large rotor, after 4 minutes at 212° F.

The practice of the invention has thus raised specific electrical resistivity by a factor of over 100, and has reduced torsional hystersis at 280° F. by over 40%. The stock, before vulcanization, has a reduced viscosity.

Although I have disclosed my invention with particular emphasis upon the preferred practice wherein the heat treatment is accompanied with mastication, nevertheless my invention can be practiced by carrying out the heat treatment under static conditions. For example, I may intimately mix the rubber, carbon black and piperidinium pentamethylene dithiocarbamate in any suitable manner and then heat this mixture at 275–400° F. without simultaneously masticating it, the heat-treated mixture being subsequently masticated and compounded with conventional compounding and vulcanizing ingredients. The static heat treatment may be conducted by placing slabs of the stock in an oven heated to a suitable temperature, or slabs of the hot stock can be stacked up and allowed to stand for several hours, preferably under relatively non-heat-conductive conditions, in order to maintain the mixture at the temperature of 275–400° F. for as long as reasonably possible. If desired, the slabs can be wrapped with a suitable insulating blanket to cause prolonged retention of heat. Such static heat treatment has the advantage of releasing the Banbury equipment from use for carrying out the heat treatment and this may be desirable under certain conditions.

The electrical resistivity values given in the above example were determined by measuring the resistance of a specimen of known thickness (about 0.1") placed between mercury electrodes, under a potential difference of 135 volts using a sensitive galvanometer with an Ayrton shunt. The logarithm (to base 10) of the specific electrical resistivity (expressed as ohm-centimeters) is designated "Log Resistivity."

The torsional hysteresis figures represent the logarithmic decrement (to base 10) of the observed amplitudes of successive oscillations of a torsion pendulum, measured at 280° F., with an apparatus consisting essentially of a torsion pendulum in which the sample of rubber tested supplies the restoring force when the pendulum is deflected. For a further description of this test see Gerke et al. 2,118,601.

Having thus described my invention, what I claim and desire to protect by Letters Patent is:

1. A process which comprises mixing a rubber selected from the group consisting of natural rubber, rubbery homopolymers of aliphatic conjugated diolefins and rubbery copolymers of aliphatic conjugated diolefins and copolymerizable monoolefinic compounds, which copolymers contain at least 50% of combined diolefin, with a relatively large amount of rubber-reinforcing carbon black and with from 1 to 3 parts by weight, per 100 parts of said rubber, of piperidinium pentamethylene dithiocarbamate, heating the mixture in the absence of sulfur and sulfur-yielding compounds at a temperature ranging from 275° F. to a point just short of that at which the rubber will be injured, thereafter incorporating vulcanizing and other desired ingredients, shaping the resulting mass, and vulcanizing the shaped mass.

2. A process which comprises mixing a rubber selected from the group consisting of natural rubber, rubbery homopolymers of aliphatic conjugated diolefins and rubbery copolymers of aliphatic conjugated diolefins and copolymerizable monoolefinic compounds, which copolymers contain at least 50% of combined diolefin, with a relatively large amount of rubber-reinforcing carbon black and with from 1 to 3 parts by weight, per 100 parts of said rubber, of piperidinium pentamethylene dithiocarbamate, masticating the mixture in the absence of sulfur and sulfur-yielding compounds at a temperature of from 275° F. to 400° F., thereafter incorporating vulcanizing and other desired ingredients, shaping the resulting mass, and vulcanizing the shaped mass.

3. A process which comprises mixing natural rubber with a relatively large amount of rubber-reinforcing carbon black and with from 1 to 3 parts of piperidinium pentamethylene dithiocarbamate per 100 parts of said rubber, masticating the mixture in the absence of sulfur and sulfur-yielding compounds at a temperature of from 275 to 400° F., thereafter incorporating vulcanizing and other desired ingredients, shaping the resulting mass, and vulcanizing the shaped mass.

References Cited in the file of this patent

UNITED STATES PATENTS

| | | |
|---|---|---|
| 2,058,246 | McCortney | Oct. 20, 1936 |
| 2,118,601 | Gerke et al. | May 24, 1938 |